March 20, 1956  H. R. ABBRECHT  2,738,621

FLOWER POT

Filed June 12, 1950

*INVENTOR.*
HERMANN R. ABBRECHT
BY Whittemore,
Hulbert & Belknap
ATTORNEYS

United States Patent Office 2,738,621
Patented Mar. 20, 1956

2,738,621

FLOWER POT

Hermann R. Abbrecht, Birmingham, Mich.

Application June 12, 1950, Serial No. 167,562

4 Claims. (Cl. 47—38)

The present invention relates to a flower pot and more particularly to a flower pot designed to facilitate the manner of and to improve the results of watering the soil within the pot.

It is an object of the present invention to provide a flower pot designed to introduce water to the soil within the pot at a point intermediate the top and bottom of the soil.

It is a further object of the present invention to provide means for introducing water to a flower pot through a lateral opening in the side of the flower pot spaced from the bottom of the pot not less than 15 percent of its height.

It is a further object of the present invention to provide a flower pot having an opening in a side wall in combination with reservoir means outside the hole which may be filled with water to effect predetermined watering of the soil within the pot.

It is a further object of the present invention to provide a flower pot designed to permit watering of certain plants therein in accordance with recommended procedure.

Other objects and features of the invention will become apparent as the description proceeds, especially when considered in conjunction with the accompanying drawings, wherein.

Figure 1:
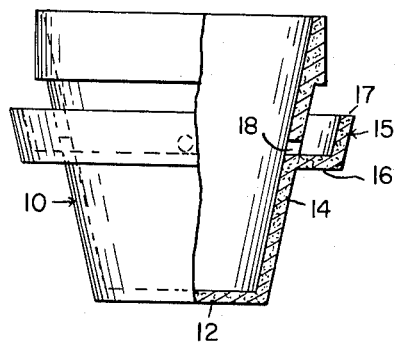
Figure 1 is a front elevation partly in section of a preferred form of the present invention.

At the present time conventional flower pots provide for watering the plant or the soil within the pot by one of two methods. In the usual type of flower pot the soil is watered by pouring the water directly on the top of the soil exposed at the open upper side of the flower pot. Certain plants such for example as African violets should not be watered in this manner. A second type of flower pot is one having openings in its bottom wall. The pot is placed in a saucer or other water containing receptacle and some of the water is drawn upwardly into the soil by capillary action. Neither of these methods is entirely satisfactory and flower pots constructed in accordance with the present invention are designed to overcome the objections to both of the aforementioned types of flower pots.

Briefly described, the present invention contemplates the provision of openings in the side wall of the flower pot through which water may be introduced. These openings are located below the top of the soil within the pot and are spaced substantially above the bottom of the pot. The precise location of the openings may be changed in accordance with the particular plant for which the pot is designed. However, in no case should the openings be spaced from the bottom of the pot a distance less than 15 percent of the height of the pot.

In some of the embodiments of the present invention reservoir means are provided outside the opening and connected by the opening with the interior of the pot.

The reservoir means are designed to contain a predetermined amount of water so that in watering the pot it will be necessary only to fill the reservoir to a predetermined level, after which this measured quantity of water will flow into the pot to effect predetermined watering. This permits carrying out watering at predetermined regular intervals since the amount of water supplied each time is uniform.

Referring now to the drawings, the pot 10 has an imperforate bottom wall 12 and a side wall 14. A reservoir or trough 15 comprising a ledge 16 and side wall or flange 17 is provided which completely surrounds the pot and which is designed to contain a definite predetermined amount of water. Openings 18 are provided affording communication between the reservoir 15 and the interior of the pot.

Figure 2:
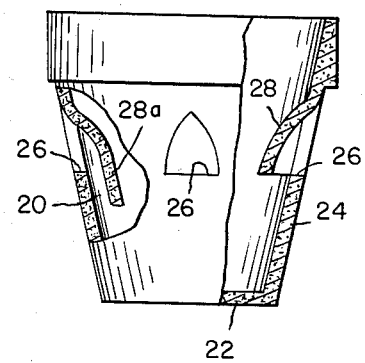
Figure 2 is a front elevation partly in section of a second embodiment of the present invention.

Referring now to Figure 2 there is illustrated a pot 20 having an imperforate bottom wall 22 and a side wall 24. Openings 26 are provided in the side wall and are conveniently formed so as to leave a portion 28 of the side wall extending inwardly and connected to adjacent wall portions at its top and sides. In this case watering is effected by pouring water through the openings 26 into the pot and for this purpose the soil directly beneath the openings 26 will normally be spaced downwardly to provide a space to receive the water.

At the left in Figure 2 is shown a slightly modified construction in which the inwardly extending portion 28a extends downwardly below the opening 26. This has the function of preventing soil from coming out of the opening and also it prevents roots from growing out through the opening. It serves a second purpose in providing a space 29 of definite and predetermined size for the reception of water so that when the pot is watered a definite and predetermined amount of water is introduced.

Figure 3:
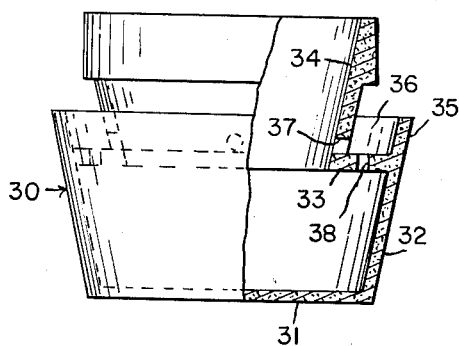
Figure 3 is a front elevation partly in section of a third embodiment of the present invention.

Referring now to Figure 3 there is illustrated a flower pot 30 having an imperforate bottom wall 31, a lower side wall 32, a radially inwardly extending ledge 33, and an upper side wall 34 extending upwardly from the inner ledge 33. The lower side wall 32 extends above the ledge 33 and thus provides an outer reservoir wall portion 35. The construction as just defined provides a reservoir 36 defined by the wall 35, the ledge 33, and the lower portion of the upper wall 34. The reservoir 36 is provided with openings 37 or 38, or both, permitting water to flow from the reservoir into the interior of the pot.

Figure 4:
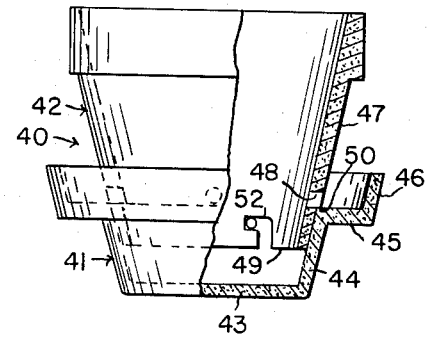
Figure 4 is a front elevation partly in section of a fourth embodiment of the present invention.

Referring now to Figure 4 there is illustrated a two-piece flower pot 40 formed of a bottom 41 and a top 42. The bottom 41 includes an imperforate bottom wall 43, side wall 44, a ledge 45 and an outer reservoir wall or flange 46. The top 42 comprises the side wall 47 open at its bottom and having ports or openings 48 extending therethrough. The lower edge of the top 42 is shaped to fit within the side wall 44 of the bottom 41. If desired, the parts may engage with a friction fit. However, as illustrated, the extreme lower portion 49 of the top 42 is of reduced size so as to provide a shoulder 50 which limits downward movement of the top 42 into the bottom 41.

If desired, mechanically interlocking means may be provided to prevent separation between the parts. Thus a bayonet type connection illustrated generally at 52 may be provided.

The embodiments of the invention illustrated in Figures 1, 3, and 4, and to some extent that illustrated in Figure 2, have the advantage that they provide reservoirs for the reception of water, liquid fertilizers, or the like. The present invention affords control over the amount of liquid to be added, since the reservoir has a definite volumetric capacity and experience will soon indicate how often the reservoir should be filled to perform adequate watering.

Due to the capacity of the reservoir, the necessity for frequent watering is avoided and a definite amount of water may be provided at definitely spaced intervals.

The present invention eliminates watering the soil from the top and thus prevents gradual packing of the soil. In this connection attention is directed to the fact that watering from the top is definitely not recommended for certain plants, such as African violets, and the present pots provide means for carrying out watering of such plants in a very advantageous manner.

Watering from the side as characterized by the present invention, permits air to enter the soil below the surface, which is a further advantage. Since part of the water introduced into the pot flows down by gravity and part of the water goes up through capillary action in the soil, a thorough soaking of the soil and plant takes place in a short time.

Pots constructed in accordance with the present invention reduce sweating of the flower pot at the bottom.

It will be noted that no drainage hole is provided in the bottom of the pot. However, due to the fact that the openings in the side are spaced well below the top of the soil, the root structure of the plants cannot be completely submerged in water as is possible in conventional pots not provided with drainage holes in which watering takes place at the top.

In using the pot according to the present invention the portion of the pot below the lateral openings may be filled with gravel, sand, or dirt in accordance with the requirements of the particular plant. In any case the plant roots will reach the water.

One of the important advantages of the present invention is that plants may be watered more rapidly than has been the case with prior conventional pots. It is unnecessary to wait for the water to soak in. Instead, the reservoirs are filled to a predetermined level so that a definitely measured quantity of water is supplied to the plant. Depending on the type of soil in the pot and the manner in which it is packed, the water in the reservoir may flow into the pot relatively rapidly or it may require a prolonged period. However, it is unnecessary to wait for the water to go in and to observe the results, since a definite predetermined quantity of water has been supplied with the predetermined filling of the reservoir.

While all of the pots have been illustrated of circular cross-section for convenience, it will be appreciated of course that the invention may be applied to square or other shaped pots as desired. Moreover, in the embodiments of the invention illustrated in Figures 1, 3, and 4, the reservoirs have been illustrated as complete annular reservoirs completely surrounding the pot with which they are associated. Instead, it will be appreciated that if desired separate independent reservoirs could be provided for each of the openings. However, the illustrated embodiment of the invention is preferred since it obviously facilitates the watering operation.

The flower pots illustrated herein may be formed of clay, tile, pottery, cement, plastic, metal or the like.

While Figure 4 illustrates construction in two pieces of a flower pot equivalent to that shown in Figure 1, it will be appreciated that if desired the flower pot illustrated in Figure 3 could likewise be made of a two-piece construction. In this case the ledge 33 would preferably be formed integral with the top wall 34 and independent of the bottom wall 32, in which case abutments could be provided if desired on the inner surface of the wall 32 to support the ledge 33.

The drawings and the foregoing specification constitute a description of the improved flower pot in such full, clear, concise and exact terms as to enable any person skilled in the art to practice the invention, the scope of which is indicated by the appended claims.

What I claim as my invention is:

1. A flower pot designed to retain soil in its lower portion in moist condition for extended periods comprising an imperforate bottom wall, a continuous side wall, a trough surrounding said side wall externally thereof, the side wall of said pot having a plurality of openings therethrough connecting the interior of said pot with the interior of said trough adjacent the bottom of the trough, said openings being spaced substantially above the bottom of said pot by an amount not less than 15% of the height of the pot, said trough having an outer side wall the top edge of which is spaced from the top of said pot a distance not less than one-third of the height of the pot, said trough having a relatively wide and unobstructed top opening to provide for ready pouring of water into the trough and to provide for direct observation to determine if water remains in the trough.

2. A flower pot designed to retain soil in its lower portion in moist condition for extended periods and to avoid harmful top watering which comprises upper and lower parts, said lower part having an imperforate bottom wall, an imperforate upwardly and outwardly inclined side wall, an outwardly extending ledge at the upper edge of said side wall, and an upwardly extending flange at the outer edge of said ledge, said upper part comprising an inwardly and downwardly tapered side wall and having an open bottom, the lower portion of said upper part snugly fitting within the upper portion of said lower part, an intermediate portion of the side wall of said upper part cooperating with said ledge and flange to form a trough, the side wall of said upper part having openings therethrough located just above the said ledge to provide for flow of water from said trough into said pot, said openings being located above the bottom of said pot a distance not less than 15% of the height of said pot, the upper edge of said upwardly extending flange being located below the top of said pot a distance not less than one-third of the height of said pot, the upper edge of said upwardly extending flange being spaced outwardly from the adjacent side wall of said upper part a distance sufficient to provide said trough with an unobstructed top opening providing for inspection of the trough to determine if water remains therein and providing for ready pouring of water into said trough.

3. A pot as defined in claim 2 in which the lower portion of said upper part has a friction fit within the upper portion of said lower part.

4. A flower pot designed to retain soil in its lower portion in moist condition for extended periods and to avoid harmful top watering, said pot comprising an imperforate bottom wall, a side wall and an open top, said side wall having a single row of openings all of which are disposed in a horizontal plane located intermediate the top and bottom of the pot and spaced above the bottom of the pot an amount not less than 15% of the height of the pot, a continuous shallow trough extending outwardly from the side of the pot and extending horizontally around said trough, said trough having a bottom wall located substantially tangent to the lower parts of said openings so that all water in said trough may flow through said openings into said pot, said trough having an outer side wall the top edge of which is substantially below the top of said pot, said trough being open at its top to facilitate pouring water into it.

References Cited in the file of this patent

UNITED STATES PATENTS

| | | |
|---|---|---|
| 153,715 | Landers | Aug. 4, 1874 |
| 446,460 | McElhiney | Feb. 17, 1891 |
| 627,231 | Hinrichs | June 20, 1899 |
| 802,460 | Marshall | Oct. 24, 1905 |
| 954,440 | Klemm | Apr. 12, 1910 |
| 1,317,569 | Forster | Sept. 30, 1919 |
| 1,383,368 | Ambrose | July 5, 1921 |
| 1,948,031 | Guille | Feb. 20, 1934 |